(12) United States Patent
Venugopal et al.

(10) Patent No.: US 12,210,661 B2
(45) Date of Patent: Jan. 28, 2025

(54) SYSTEM AND METHOD FOR MONITORING AND CONTROLLING COMPUTER USAGE IN A REMOTE HOME WORK ENVIRONMENT

(71) Applicant: Sutherland Global Services Inc., Pittsford, NY (US)

(72) Inventors: Manikhandan Venugopal, West Lafayette, IN (US); P. Ezhumalai, Trichy (IN); A Malathi, Chennai (IN); M Marimuthu, Vellore (IN); Priya S. Mohana, Chennai (IN); Anandan Prabu, Chennai (IN); Subramaniyam Preethi, Chennai (IN); Ganesan Ramalingam, Chennai (IN); Amin A. Sarfraz, Chennai (IN); Ajith Sathiya, Chennai (IN); K Siddharthan, Chennai (IN); Kumar T. Suresh, Karur (IN); Nathan Vickram, Chennai (IN)

(73) Assignee: Sutherland Global Services Inc., Pittsford, NY (US)

( * ) Notice: Subject to any disclaimer, the term of this patent is extended or adjusted under 35 U.S.C. 154(b) by 362 days.

(21) Appl. No.: 17/533,629

(22) Filed: Nov. 23, 2021

(65) Prior Publication Data
US 2023/0161920 A1    May 25, 2023

(51) Int. Cl.
*H04L 29/06* (2006.01)
*G06F 9/4401* (2018.01)
(Continued)

(52) U.S. Cl.
CPC .............. *G06F 21/84* (2013.01); *G06F 9/442* (2013.01); *G06V 10/46* (2022.01); *G06V 10/56* (2022.01);
(Continued)

(58) Field of Classification Search
CPC ......... G06F 21/84; G06F 9/442; G06V 10/50; G06V 20/52; G06V 40/168; G06V 20/46;
(Continued)

(56) References Cited

U.S. PATENT DOCUMENTS

| | | |
|---|---|---|
| 8,191,152 B1 | 5/2012 | Barker |
| 10,380,368 B1 | 8/2019 | Sampson |

(Continued)

OTHER PUBLICATIONS

Rodriquez, Kari, "International Search Report and Written Opinion of the International Searching Authority", PCT International Application No. PCT/US2022/80382 filed on Nov. 23, 2022, mailed on Mar. 3, 2023, United States Patent and Trademark Office, Alexandria, VA (8 pages).

*Primary Examiner* — Evans Desrosiers
(74) *Attorney, Agent, or Firm* — Woods Oviatt Gilman LLP; Dennis B. Danella, Esq.

(57) ABSTRACT

A method for monitoring and controlling usage of a remote work computing device is provided. The work computing device is in communication with a first computing device over a network, and comprises a display including a field of view (FOV) and a camera directed at the FOV. The method comprises: providing a first memory for storing a feature/attribute of an unauthorized object; capturing a digital image using the camera including a first object in the FOV; identifying a feature/attribute of the first object; and comparing the feature/attribute of the first object with the feature/attribute of the unauthorized object. When the feature/attribute of the first object matches the feature/attribute of the unauthorized object, a notification is communicated to the first computing device including the captured digital image, the display is prevented from being viewed from the FOV, and/or a task manager window is captured and communicated to the first computing device.

61 Claims, 9 Drawing Sheets

(51) Int. Cl.
| | |
|---|---|
| *G06F 21/84* | (2013.01) |
| *G06V 10/46* | (2022.01) |
| *G06V 10/56* | (2022.01) |
| *G06V 10/75* | (2022.01) |
| *G06V 20/40* | (2022.01) |
| *G06V 20/52* | (2022.01) |
| *G06V 40/16* | (2022.01) |
| *H04N 7/18* | (2006.01) |

(52) U.S. Cl.
CPC ............ *G06V 10/751* (2022.01); *G06V 20/46* (2022.01); *G06V 20/52* (2022.01); *G06V 40/168* (2022.01); *G06V 40/172* (2022.01); *G06V 40/178* (2022.01); *H04N 7/188* (2013.01); *G06V 2201/02* (2022.01)

(58) Field of Classification Search
CPC .... G06V 40/172; G06V 10/751; G06V 10/46; G06V 40/178; G06V 2201/02; H04N 7/188
See application file for complete search history.

(56) References Cited

U.S. PATENT DOCUMENTS

| | | | |
|---|---|---|---|
| 2008/0298571 A1* | 12/2008 | Kurtz | ............... G06F 3/017 348/E7.083 |
| 2016/0226858 A1 | 8/2016 | Pritchard, Jr. | |
| 2019/0026487 A1 | 1/2019 | Ichida | |
| 2020/0293818 A1 | 9/2020 | Bapat et al. | |
| 2020/0349920 A1 | 11/2020 | Al Bawab | |
| 2021/0073421 A1* | 3/2021 | Anderson | ............... G06F 3/013 |

* cited by examiner

| AUTHORIZED USER | FIELD 1 - NAME | FIELD 2 - ADDRESS | FIELD 3 – SS# | FIELD 4 – CC# |
|---|---|---|---|---|
| AUTHORIZED USER 1 | REDACT | REDACT | REDACT | REDACT |
| AUTHORIZED USER 2 | REDACT | NO REDACT | REDACT | REDACT |
| AUTHORIZED USER 3 | NO REDACT | NO REDACT | NO REDACT | NO REDACT |

SYSTEM AND METHOD FOR MONITORING AND CONTROLLING COMPUTER USAGE IN A REMOTE HOME WORK ENVIRONMENT

FIELD OF THE INVENTION

The present invention is directed to a system and method for monitoring and controlling usage of a work computing device in a home work environment; more particularly, utilizing a camera in association with the work computing device, along with computer executable instructions, to detect and analyze a digital image or a plurality of digital images (i.e., video) to determine if unauthorized objects or unauthorized users are present in the camera's field of view, and to take appropriate action to prevent the display of information on the work computing device and/or send a notification to an administrative computing device in communication with the work computing device over a network.

BACKGROUND OF THE INVENTION

Given the emergence of the recent global pandemic and widespread shut down of many brick and mortar offices and businesses, it has been a necessity for many workers to work out of their home residence. The growing availability of internet connectivity, and technological advances such as cloud computing, video conferencing, and instant messaging, many workers have made a smooth and efficient transition to working remotely on a daily basis.

While working remotely has allowed for businesses to continue operations and utilize their employees, allowing employees to perform their work in the home environment comes with certain security risks. In the home work environment, an employer does not control over the presence and conduct of third parties that may be able to view information on the computer monitor or have access to the computer itself. This is especially problematic for those businesses that involve transactions requiring highly confidential and sensitive information or data where the employer may have an ongoing duty to protect the disclosure and maintain the security of such information. There also may be less control of the type of computer applications that are used by employees during work hours. For instance, an employee could be using a key logger or screen capture software application without the employer knowledge which runs in the background of the work computing device and records the employee's inputs throughout the work day to acquire sensitive customer information. This lack of control of the home work environment could be problematic for an employer.

Accordingly there is a need for a system and method for monitoring and controlling computer usage in a remote home work environment. The present invention fills these needs as well as other needs.

SUMMARY OF THE INVENTION

In one aspect, the present invention includes a system for monitoring and controlling usage of a work computing device located in a home work environment or a typical office environment, wherein the work computing device is in communication with a first computing device over a network. The system comprises a first memory, a display including a field of view, a camera, and a processor. The first memory includes storing computer-executable instructions, and at least one feature or attribute of at least one unauthorized object, stored therein. The camera is directed at the field of view and configured for capturing at least one digital image. The processor is configured for executing the computer-executable instructions to perform the steps of: (a) capturing the at least one digital image using the camera, wherein the at least one digital image includes a first object (e.g., mobile phone, digital tablet, laptop, notepad, or writing utensil) in the field of view, which may include masking or obscuring the background of the digital image; (b) storing the at least one digital image that was captured in the first memory; (c) identifying at least one feature or attribute of the first object captured in the at least one digital image; and (d) comparing the at least one feature or attribute of the first object with the at least one feature or attribute of the at least one unauthorized object. When the at least one feature or attribute of the first object matches the at least one feature or attribute of at least one unauthorized object, the processor is configured for: (i) sending a notification to the first computing device over the network, wherein the notification includes the at least one digital image captured by the camera; (ii) preventing at least a portion of the display from being viewed from the field of view by shutting down the work computing device; and/or capturing data identifying one or more software applications that are running on the work computing device, and sending the captured data to the first computing device over the network, for example. The step of capturing data identifying the one or more software applications that are running on the work computing device may include opening a task manger window on the work computing device and taking a screen shot of the task manger window, wherein the task manger window includes a list of software applications running on the work computing device. The at least one attribute of the at least one unauthorized object may be at least one dimension or shape of the at least one unauthorized object stored in the first memory, and the at least one attribute of the first object is at least one dimension or shape of the first object. Further, the at least one feature of the at least one unauthorized object is a digital image of the at least one unauthorized object stored in the first memory, and wherein the at least one feature of the first object is a digital image of the first object.

In another aspect, a computer-implemented method programmed for execution in a computing environment for monitoring and controlling usage of a work computing device located in a home work environment or a typical office environment is provided. The work computing device is in communication with a first computing device over a network, wherein the work computing device comprises a display including a field of view, a camera directed at the field of view and configured for capturing at least one digital image, and a processor configured for executing computer-executable instructions. Utilizing the processor, the method comprises: (a) providing a first memory for storing the computer-executable instructions, wherein at least one feature or attribute of at least one unauthorized object is stored in the first memory; (b) capturing the at least one digital image using the camera, wherein the at least one digital image includes a first object in the field of view; (c) storing the at least one digital image that was captured in the first memory, which may include masking or obscuring the background of the digital image; (d) identifying at least one feature or attribute of the first object captured in the at least one digital image; and (e) comparing the at least one feature or attribute of the first object with the at least one feature or attribute of the at least one unauthorized object, wherein when the at least one feature or attribute of the first object matches the at least one feature or attribute of at least one unauthorized object, the processor is configured for performing at least one of the following additional steps: (i) sending a notification to the first computing device over the network, wherein the notification includes the at least one digital image captured by the camera; (ii) preventing at least a portion of the display from being viewed from the field of view; and/or (iii) capturing data identifying one or more software applications that are running on the work computing device, and sending the captured data to the first computing device over the network. The step of capturing data identifying the one or more software applications that are running on the work computing device may include opening a task manger window on the work computing device and taking a screen shot of the task manger window, wherein the task manger window includes a list of software applications running on the work computing device In a further aspect, a system for monitoring and controlling usage of a work computing device located in a home work environment a typical office environment is provided. The work computing device is in communication with a first computing device over a network. The system comprises a first memory for storing computer-executable instructions, and at least one feature or attribute of at least one authorized user, stored therein. The system further includes a display including a field of view, a camera directed at the field of view and configured for capturing at least one digital image, and a processor. The processor is configured for executing the computer-executable instructions to: (a) capture the at least one digital image using the camera, wherein the at least one digital image includes a first user in the field of view, wherein the background of the digital image may be masked or obscured; (b) store the at least one digital image that was captured in the first memory; (c) identify at least one feature or attribute of the first user captured in the at least one digital image; and (d) compare the at least one feature or attribute of the first user with the at least one feature or attribute of the at least one authorized user. When the at least one feature or attribute of the first user does not match the at least one feature or attribute of at least one authorized user, the processor is configured to: (i) send a notification to the first computing device over the network, wherein the notification includes the at least one digital image captured by the camera; (ii) prevent the display from being viewed from the field of view; and/or (iii) capture data identifying one or more software applications that are running on the work computing device, and send the captured data to the first computing device over the network. The step of capturing data identifying the one or more software applications that are running on the work computing device may include opening a task manger window on the work computing device and taking a screen shot of the task manger window, wherein the task manger window includes a list of software applications running on the work computing device. The at least one attribute of the at least one authorized user may be at least one of hair color, eye color, gender, or age of the at least one authorized user stored in the first memory, and the at least one attribute of the first user is at least one of hair color, eye color, gender, or age of the first user. Also, the at least one feature of the at least one authorized user is at least one of face shape, nose shape, ear shape, cheek structure, chin shape, or existence of glasses on the at least one authorized user stored in the first memory, and the at least one feature of the first user is at least one of face shape, nose shape, ear shape, cheek structure, chin shape, or existence of glasses on the first user.

The at least one captured digital image may also include a second user in the field of view. When the second user is captured in the field of view, the processor is configured for performing at least one of the following additional steps of: (e)(i) sending a notification to the first computing device over the network, wherein the notification includes the at least one digital image including the second user captured by the camera; and/or (e)(ii) preventing at least a portion of the display from being viewed from the field of view. Further, when the second user is captured in the field of view, the processor is configured for performing the step of comparing the at least one feature or attribute of the second user with the at least one feature or attribute of the at least one authorized user. When the at least one feature or attribute of the second user does not match the at least one feature or attribute of the at least one authorized user, the method proceeds with at least one of steps (e)(i), (e)(ii), and/or (e)(iii). In addition, it should be understood that the at least one digital image could be a plurality of digital images, wherein each of the plurality of digital images are captured at a predetermined time interval or at random time intervals.

In yet a further aspect, a computer-implemented method programmed for execution in a computing environment for monitoring and controlling usage of a work computing device located in a home work environment or a typical office environment is provided. The work computing device is in communication with a first computing device over a network. The work computing device comprises a display including a field of view, a camera directed at the field of view and configured for capturing at least one digital image, and a processor configured for executing computer-executable instructions. Utilizing the processor, the method comprises: (a) providing a first memory for storing the computer-executable instructions, wherein at least one feature or attribute of at least one authorized user is stored in the first memory; (b) capturing the at least one digital image using the camera, wherein the at least one digital image includes a first user in the field of view, wherein the background of the digital image may be masked or obscured; (c) storing the at least one digital image that was captured in the first memory; (d) identifying at least one feature or attribute of the first user captured in the at least one digital image; and (e) comparing the at least one feature or attribute of the first user with the at least one feature or attribute of the at least one authorized user, wherein when the at least one feature or attribute of the first user does not match the at least one feature or attribute of at least one authorized user, the processor is configured for performing at least one of the following additional steps: (i) sending a notification to the first computing device over the network, wherein the notification includes the at least one digital image captured by the camera; (ii) preventing at least a portion of the display from being viewed from the field of view; and/or (iii) capturing data identifying one or more software applications that are running on the work computing device, and sending the captured data to the first computing device over the network. The step of capturing data identifying the one or more software applications that are running on the work computing device may include opening a task manger window on the work computing device and taking a screen shot of the task manger window, wherein the task manger window includes a list of software applications running on the work computing device In addition, the at least one captured digital image may include a second user (e.g., user face) in the field of view, wherein when the second user is captured in the field of view, the processor is configured for performing at least one of the following additional steps: (i) sending a notification to the first computing device over the network, wherein the notification includes the at least one digital image including the second user captured by the camera; (ii) preventing the display from being viewed from the field of view; and/or (iii) capturing data identifying one or more software applications that are running on the work computing device, and sending the captured data to the first computing device over the network. Further, when the second user is captured in the field of view, the processor is configured for performing the step of comparing the at least one feature or attribute of the second user with the at least one feature or attribute of the at least one authorized user, and wherein when the at least one feature or attribute of the second user does not match the at least one feature or attribute of the at least one authorized user, the method proceeds with at least one of steps (e)(i), (e)(ii), and/or (e)(iii).

BRIEF DESCRIPTION OF THE DRAWINGS

The above-mentioned and other features and advantages of this invention, and the manner of attaining them, will become apparent and be better understood by reference to the following description of the invention in conjunction with the accompanying drawing, wherein.

DETAILED DESCRIPTION OF THE INVENTION

Generally, the systems and methods described herein for monitoring and controlling usage of a work computing device in a home or office work environment may be implemented in hardware, software or a combination thereof, and may be distributed across a variety of computing devices.

This document is organized as follows. In the first section for each embodiment, an overview of the techniques and implementation in accordance with certain aspects of the invention is provided. In the next section for each embodiment, an exemplary system and algorithms for providing aspects of the present invention are discussed. Following these sections, an exemplary computer environment for the implementation and use of the invention is described.

Figure 1:
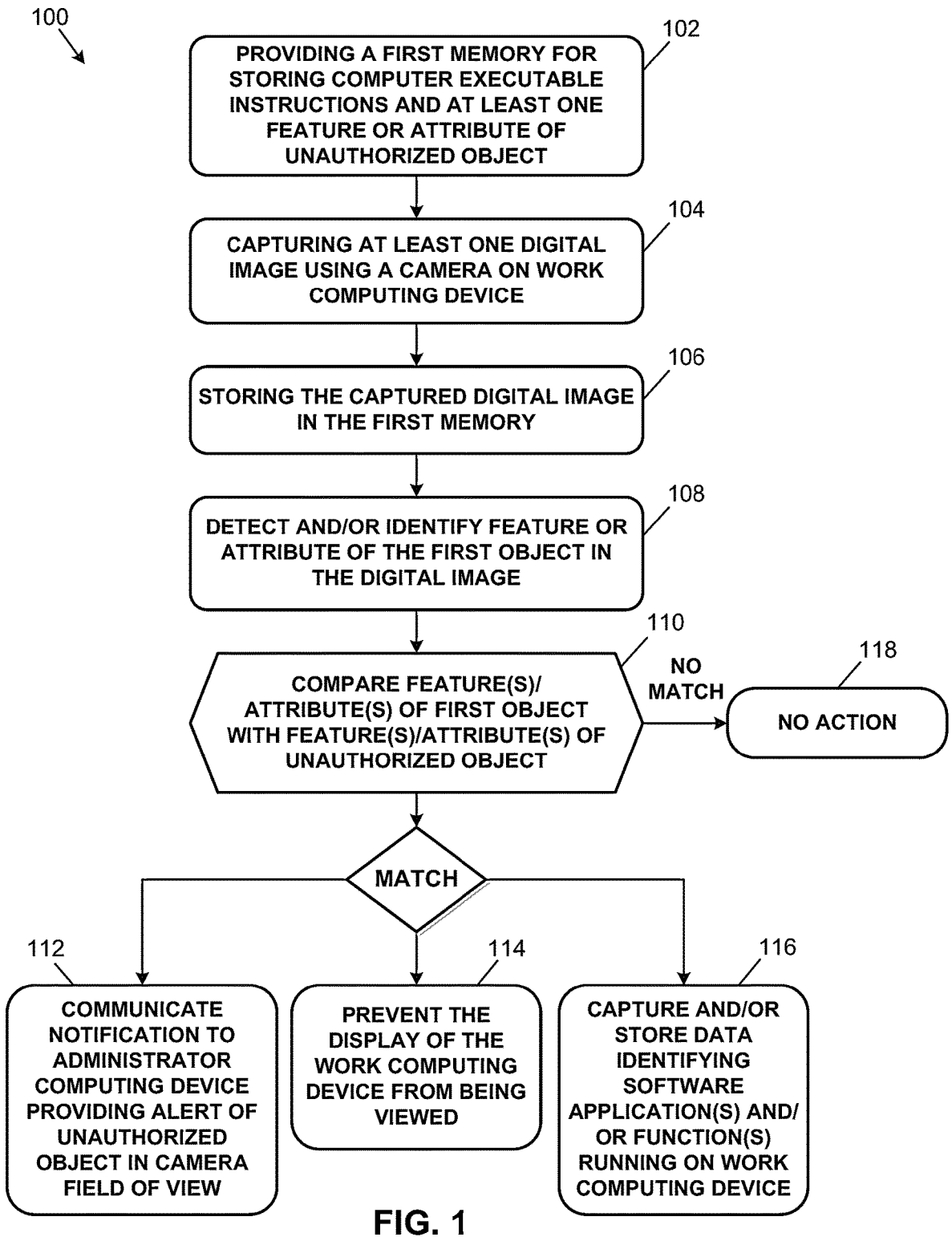
FIG. 1 is a flow chart illustrating an exemplary method for implementing one or more aspects of the present invention.
Figure 2:
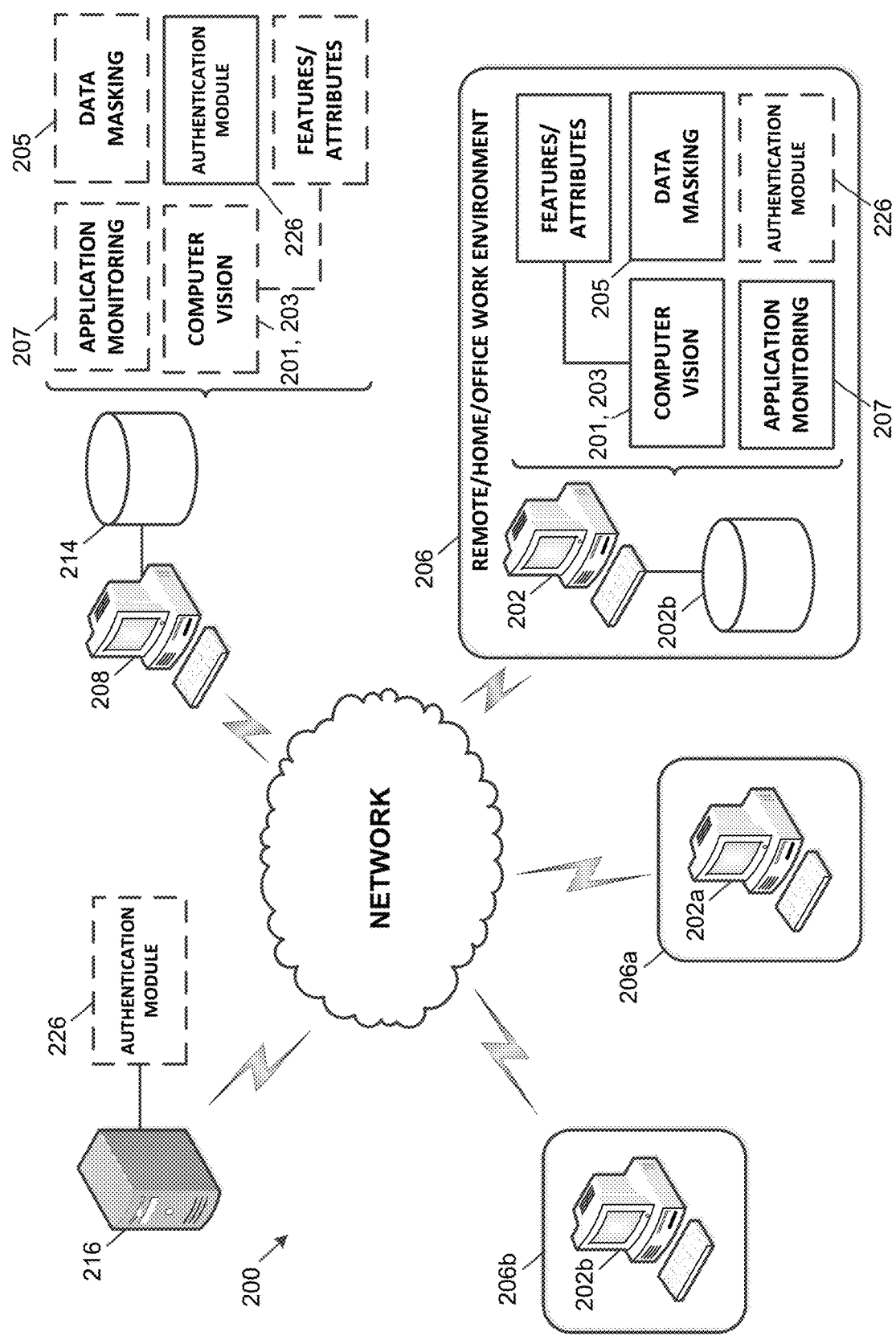
FIG. 2 is a system diagram generally illustrating various components that may be utilized for the implementation of one or more aspects of the present invention set forth in FIG. 1.

In a traditional brick and mortar office environment, an employer is able monitor and control access to its computing devices using access control cards and surveillance cameras located in certain physical locations throughout the workplace. In a work-at-home scenario and in some traditional brick and mortar office environments, these traditional solutions are difficult and not practical to implement. In general, and as best seen in FIGS. 1 and 2, the present invention provides a real-time computer-implemented computer vision method 100 in the form of computer-executable instructions 201 programmed for monitoring and controlling usage of a work computing device located in a home work environment, wherein the work computing device is in communication with an administrative computing device over a network. In the following discussion, reference will be made to the work computing device being used in a home work environment. It should be understood that the discussion applied equally to the work computing device being used in a traditional brick and mortar office environment as well.

The work computing device comprises a display including a field of view, a camera directed at the field of view and configured for capturing at least one digital image, and a processor configured for executing computer-executable instructions. Method 100 may include the step of providing a first memory for storing the computer-executable instructions at step 102. It should also be understood that at least one feature (e.g., image) or attribute (e.g., size, shape, proportions, dimensions) of at least one unauthorized object is also stored in the first memory. The first memory may be incorporated within one or more of the work computing device, a remote server that is in communication with the work computing device over the network, or in a memory included within the administrative computing device. Further, the unauthorized object may be any object that is deemed to be capable of viewing, capturing, storing, recording, transmitting or otherwise taking information being displayed or communicated to the display for an improper purpose, such as, but not limited to, a mobile phone, digital tablet, laptop, notepad, or writing utensil.

Method 100 further comprises the step of capturing at least one digital image using the camera at step 104. The camera is configured to capture a single digital image, a number of digital images in quick succession (i.e., burst), or a video (i.e., a plurality of digital images), all of which fall within the scope of at least one digital image. The least one digital image includes a first object depicted therein. The initiation of the capture of the at least one digital image may be accomplished in any number of ways. For instance, the camera may include a motion sensor that triggers the capture of the at least one digital image upon sensing or detecting movement or the presence of an object in the field of view. In another example when a plurality of digital images are captured by the camera, the capture of successive digital images may be done at a predetermined time interval (e.g., every 5 seconds) or at random time intervals to keep the user of the work computing device guessing as to when the capture will take place. For purposes of the discussion herein, any reference to digital image will also include a plurality of digital images unless the context of the discussion indicates otherwise.

Method 100 may further comprise the step of storing the captured digital image in the first memory at step 106. The stored digital image may include or be provided (e.g., tagged, metadata) with a time stamp or a unique identifier to allow for the sorting and/or searching of the stored digital image for purposes of review and memorialization of the events occurring in the field of view of the camera. After the captured digital image is stored in the first memory, at least one feature or attribute of the first object captured in the digital image is detected and/or identified at step 108. This identification may be accomplished using any known machine learning computer vision techniques, including but not limited to, a background subtraction algorithm or a cognitive-based computer detection/classification algorithm.

Once the at least one feature or attribute of the first object is detected and/or identified, the detected feature/attribute is compared with the feature(s)/attribute(s) of the at least one unauthorized object stored in the first memory at step 110 to determine if the first object is an unauthorized object. When the identified feature or attribute of the first object matches the stored feature or attribute of at least one unauthorized object, the processor is configured for sending or otherwise communicating a notification to the administrative computing device over the network to provide an alert that an unauthorized object is present in the field of view at step 112. The notification to the administrative computing device may include a textual message and/or the captured digital image itself so that such digital image can be viewed on the administrative computing device.

In addition, or alternatively, to step 112, the processor may be configured to prevent at least a portion of the display from being viewed from the field of view at step 114 if the identified feature or attribute of the first object matches the stored feature or attribute of at least one unauthorized object. Therefore, if for example a mobile phone is included within the captured digital image, and a mobile phone is identified as an unauthorized object, the present method may include preventing the entire display from being viewed and potentially recorded using the mobile phone. In one example, preventing the entire display from being viewed may include shutting down the display of the work computing device, locking the work computing device, or shutting down the entire work computing device. Instead of preventing the entire display from being viewed, step 114 may include redacting a portion of the display that includes certain information, such as, for example, personal identifiable information or other sensitive information.

In addition, or alternatively, to step 112 and/or step 114, the processor may be configured to capture and/or store data that identifies the software applications and/or other functions that are running on the work computing device when at least one unauthorized object is detected and identified as an unauthorized object. For example, at step 116, the processor may be configured to open the task manager function in the work computing device and then take a screen shot of the list of software applications and/or other functions being displayed in the take manager window. This screen shot provides a record of the software applications that the work computing device is running at the time the unauthorized object is detected. The screen shot record may then be communicated to administrative computing device over the network and displayed for immediate review, or stored in a memory for review at a later time using administrative computing device. This would allow an administrative to determine if any of the software applications being run on the work computing device could have been potentially used to capture or otherwise use the displayed data on the work computing device for an unauthorized purpose.

When the identified feature or attribute of the first object does not match the stored feature or attribute of at least one unauthorized object, then no action is taken at step 118.

Figure 3:
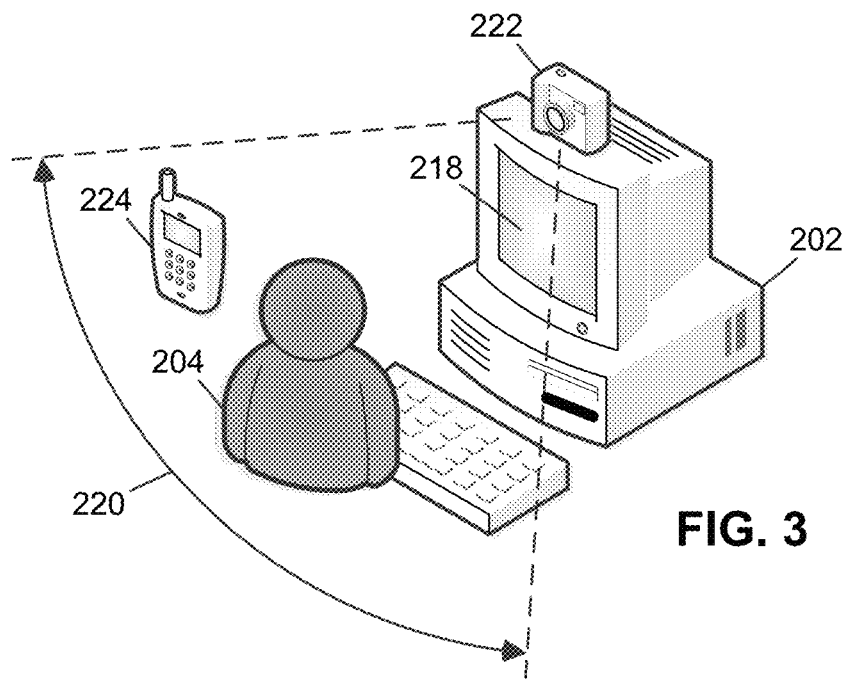
FIG. 3 is a schematic view showing certain aspects of the method set forth in FIG. 1.

Now referring to FIG. 2, an exemplary system that may be used to implement computer vision method 100, and other methods and aspects described herein, is identified as reference number 200. In particular, and as described above, system 200 is configured for monitoring and controlling usage of a work computing device 202 by a user 204 (FIG. 3) located in a home/remote or office work environment 206 (referred to herein as "work environment"). Work computing device 202 may be any type of computing device, including, but not limited to a personal computer, laptop, mobile phone, or digital tablet. The home work environment 206 may be any location that is outside the physical location of the regular place of business of user's 204 employer, such as, but not limited to, the user's place of residence or public location (e.g., library, coffee shop, etc.).

With continued reference to FIG. 2, work computing device 202 is in communication with an administrative computing device 208 over a network 210. Network 210 may be any type of network, such as a wide area network (WAN) or local area network (LAN) through a wired or wireless connection. First computing device 208 may be an administrative computing device that is managed and/or controlled by the user's 204 employer, supervisor, or other designated third party that is tasked to control or monitor the usage of work computing device 202. For purposes of the discussion herein, the first computing device will be referred to herein as the administrative computing device. While the discussion herein describes the functionality of administrative computing device 208 with respect to work computing device 202, it should be understood that the methodology described herein can be implemented in association with a plurality of work computing devices 202*a*, 202*b* located on in different home work environments 204*a*, 204*b*.

Figure 3A:
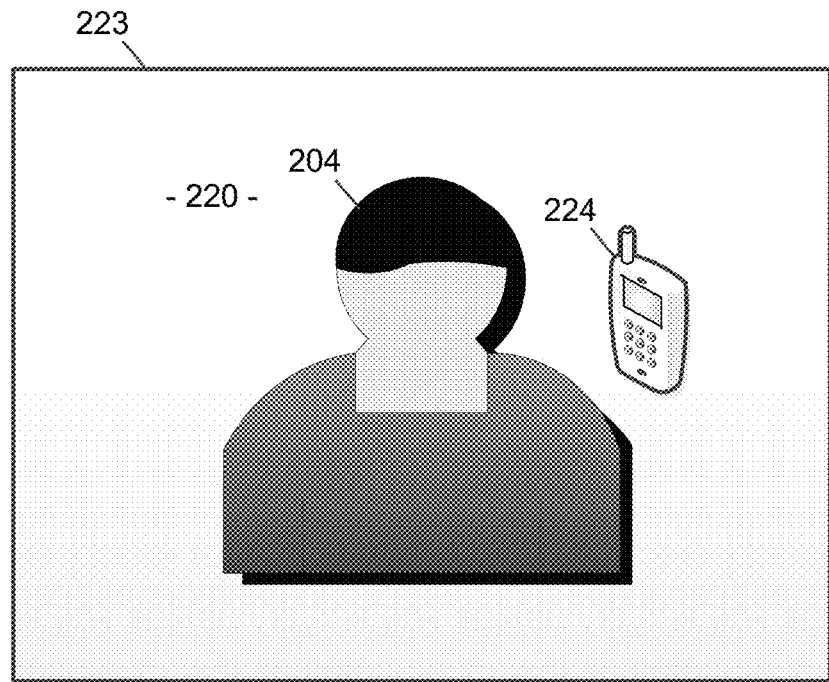
FIG. 3A is a schematic view of a digital image captured during the method set forth in FIG. 1.

Method 100 described above may be implemented using computer executable instructions that are stored locally in a memory 212 included in work computing device 202, a memory 214 included in administrative computing device 208, or a server 216 that is in communication with work computing device 202 and administrative computing device 208. In order to implement the computer executable instructions, system 200 provides for the storage of at least one feature or attribute of at least one unauthorized object in memory 212, 214, and/or 216. With additional reference to FIGS. 3 and 3A, work computing device 202 includes a display 218 having a field of view (FOV) 220, and a camera 222 is directed at field of view 220 and is configured for capturing at least one digital image 223. It should be understood that camera 222 may be a webcam configured for taking individual digital photos and/or capturing real-time video. Also, a video can include a plurality of sequential digital images. For purposes of the discussion herein and subsequently described embodiments, any reference to a digital image shall include a single digital image, or a video including a plurality of digital images.

Work computing device 202 further includes a processor configured for executing the computer-executable instructions to perform the steps of capturing digital image 223 using camera 222, wherein digital image 223 includes a first object 224 (e.g., mobile phone, digital tablet, laptop, notepad, or writing utensil) in field of view 220, and storing digital image 223 that was captured in one or more of memory 212, 214, and/or 216. It should be understood that the capture of a plurality of digital images may take place at a pre-determined time interval or random time intervals. Computer executable instructions are further configured to identify or detect at least one feature or attribute of first object 224 captured in the captured digital image, and then compare the at least one feature or attribute of first object 224 with the at least one feature or attribute of the unauthorized object(s).

When the feature or attribute of first object 224 matches the feature or attribute of the unauthorized object, the processor in the work computing device 202 is configured for executing computer executable code that operates to send a notification to the administrative computing device 208 over network 210, wherein the notification may include the at least one digital image captured by the camera. The digital image included in the notification may include or be provided with a time stamp or other unique searchable identifier so that the digital image can be searched and retrieved from the memory for later viewing on administrative computing device 208. The processor in the work computing device 202 may also, or alternatively, execute computer executable code that is configured to prevent at least a portion of display 218 from being viewed from field of view 220 to prevent first object 224 from being used to obtain information being displayed on display 218 in the manner described above with respect to method 100. The processor in work computing device 202 may also, or alternatively, execute computer executable code that is configured to capture and/or store representative data that identifies the software applications and/or other functions that are running on the work computing device 202 when at least one unauthorized object is detected and identified as an unauthorized object. This representative data can take the form of, for example, a screen shot of a task manager window that is automatically opened on work computing device 202 when an authorized object is detected, which shows all of the software applications and/or other functions running on work computing device 202 at the time the unauthorized object was detected.

Figure 4:
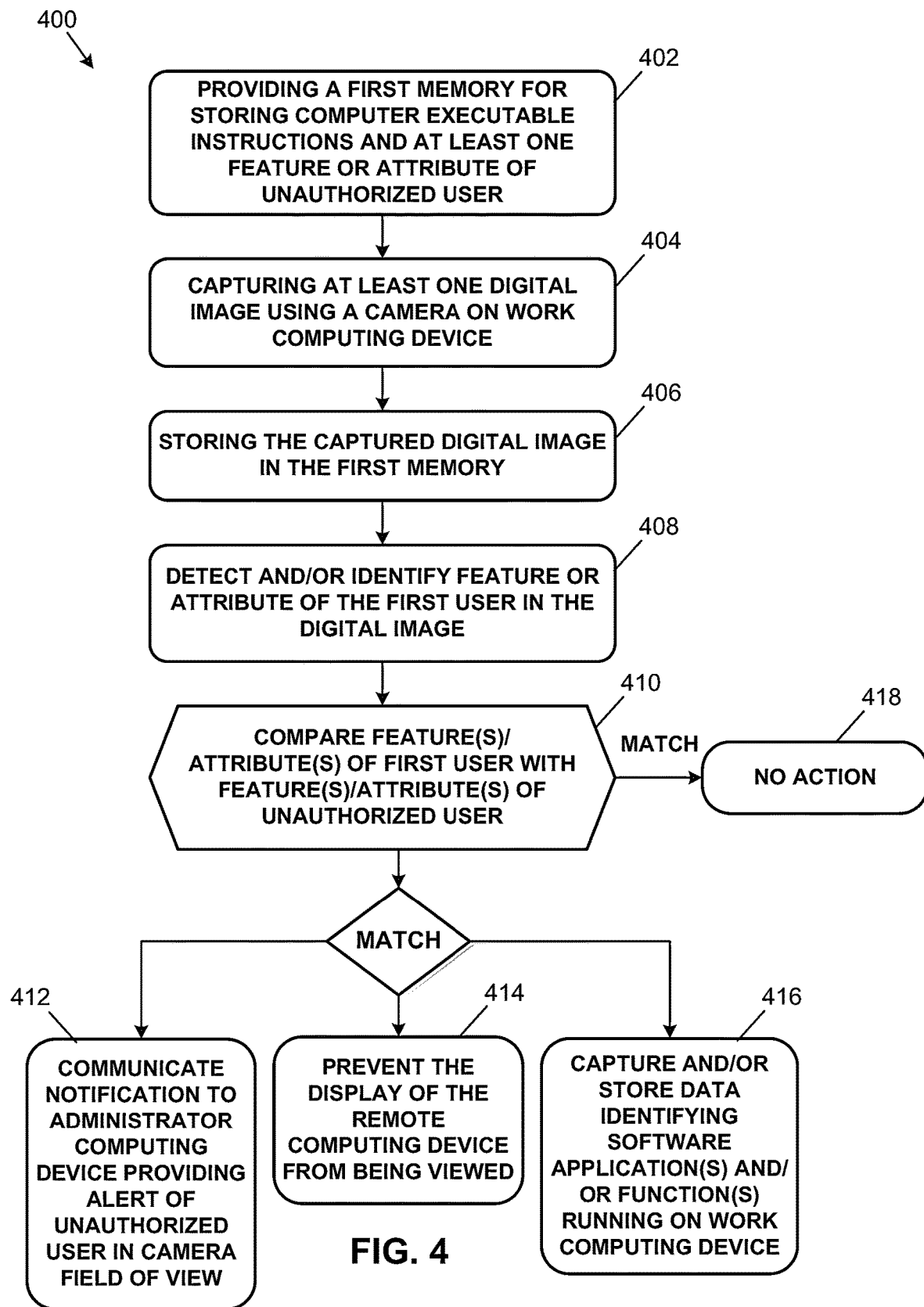
FIG. 4 is a flow chart illustrating another exemplary method for implementing one or more aspects of the present invention.

In another aspect and similar to the concepts discussed above with respect to method 100, as best seen in FIG. 4, the present invention provides a computer-implemented computer vision method 400 including executable instructions 203 (FIG. 2) programmed for execution in a computing environment for monitoring and controlling usage of a work computing device located in a home work environment, wherein the work computing device is in communication with a first computing device over a network. It should be understood that the description and definitions provided above with respect to method 100 also apply to method 400. The work computing device comprises a display including a field of view, a camera directed at the field of view and configured for capturing at least one digital image, and a processor configured for executing computer-executable instructions. Method 400 may include the step of providing a first memory for storing the computer-executable instructions at step 402. At least one feature (e.g., face shape, nose shape, ear shape, cheek structure, chin shape, or existence of glasses, image) or attribute (e.g., size, shape, proportions, dimensions, hair color, eye color, gender, or age) of at least one authorized user is stored in the first memory. The first memory may be incorporated within one or more of the work computing device, a remote server that is in communication with the work computing device over the network, or in a memory included within the administrative computing device.

Method 400 further comprises capturing the at least one digital image using the camera at step 404. The camera is configured to capture a single digital image, a plurality digital images (i.e., burst), or a video, all of which fall within the scope of at least one digital image. The at least one digital image includes a first user depicted therein. The initiation of the capture of the at least one digital image may be accomplished in any number of ways. For instance, the camera may include a motion sensor that triggers the capture of the at least one digital image upon sensing or detecting movement or the presence of a person in the field of view. In another example when a plurality of digital images are captured by the camera, the capture of successive digital images may be done at a predetermined time interval (e.g., every 5 seconds) or at random time intervals to keep the user of the work computing device guessing as to when the capture will take place. For purposes of the discussion herein, any reference to digital image will also include a plurality of digital image unless the context of the discussion indicated otherwise.

Method 400 may further comprise the step of storing the captured digital image that was captured in the first memory at step 406. The stored digital image may include or be provided (e.g., tagged, metadata) with a time stamp or a unique identifier to allow for the sorting and/or searching of the stored digital image for purposes of review and memorialization of the events occurring in the field of view of the camera. After the captured digital image is stored in the first memory, at least one feature or attribute of the first user captured in the digital image is detected and/or identified at step 408. This identification may be accomplished using any known machine learning computer vision techniques, including but not limited to, a background subtraction algorithm or a cognitive-based computer detection/classification algorithm.

Once the at least one feature or attribute of the first user is detected and/or identified, the detected feature/attribute is compared with the feature(s)/attribute(s) of the authorized user stored in the first memory at step 410 to determine if the first user is an authorized user. When the identified feature or attribute of the first user matches the stored feature or attribute of at least one unauthorized user, the processor is configured for sending or otherwise communicating a notification to the administrative computing device over the network to provide an alert that an unauthorized user is present in the field of view at step 412. The notification to the administrative computing device may include a textual message and/or the captured digital image itself so that such digital image can be viewed on the administrative computing device.

In addition, or alternatively, to step 412, the processor may be configured to prevent at least a portion of the display from being viewed from the field of view at step 414 if the identified feature or attribute of the first user matches the stored feature or attribute of at least one unauthorized user. Therefore, for example, if an individual (e.g., non-employee) is included within the captured digital image, and the individual is identified as an unauthorized user, the present method 400 may include preventing the entire display from being viewed and potentially read by the unauthorized individual. In one example, preventing the entire display from being viewed may include shutting down the display of the work computing device, or the entire work computing device. Instead of preventing the entire display from being viewed, step 414 may include redacting a portion of the display that includes certain information, such as, for example, personal identifiable information or other sensitive information.

In addition, or alternatively, to step 412 and/or step 414, the processor may be configured to store data that identifies the software applications and/or other functions that are running on the work computing device when at least one unauthorized individual is detected and identified as an unauthorized individual. For example, at step 416, the processor may be configured to open the task manager function in work computing device and take a screen shot of the list of software applications and/or other functions being displayed in the take manager window. The screen shot provides a record of the software applications that the work computing device is running when the unauthorized individual is detected. The screen shot record may then be communicated to administrative computing device over the network and displayed for immediate review, or stored in memory for review at a later time using the administrative computing device. This would allow an administrative to determine if any of the software applications being run on the work computing device could have been potentially used to capture or otherwise use the displayed data on the work computing device for an unauthorized purpose.

When the identified feature or attribute of the first user matches the stored feature or attribute of at least one unauthorized user, then no action is taken at step 418.

Figure 5:
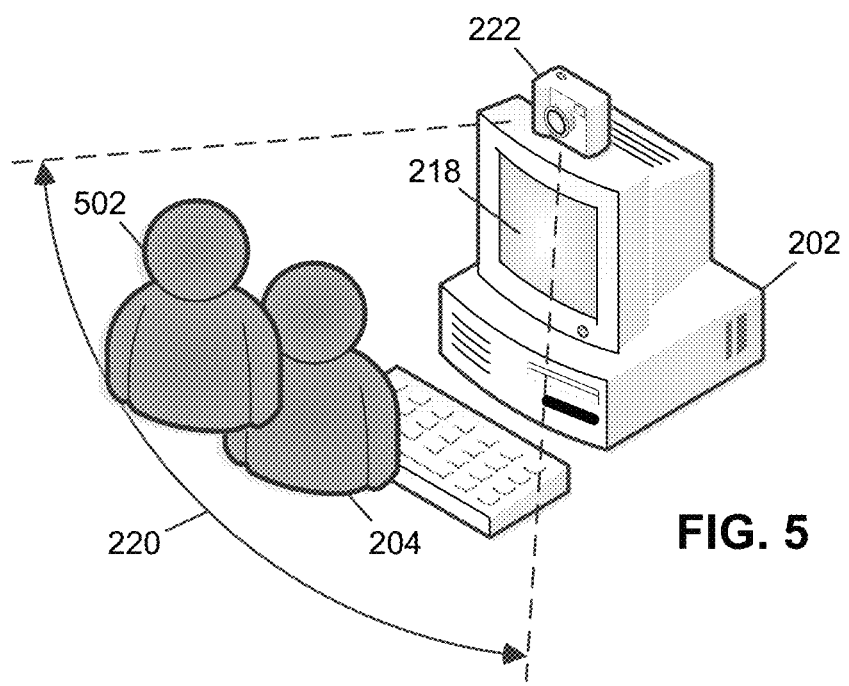
FIG. 5 is a schematic view showing certain aspects of the method set forth in FIG. 1.
Figure 5A:
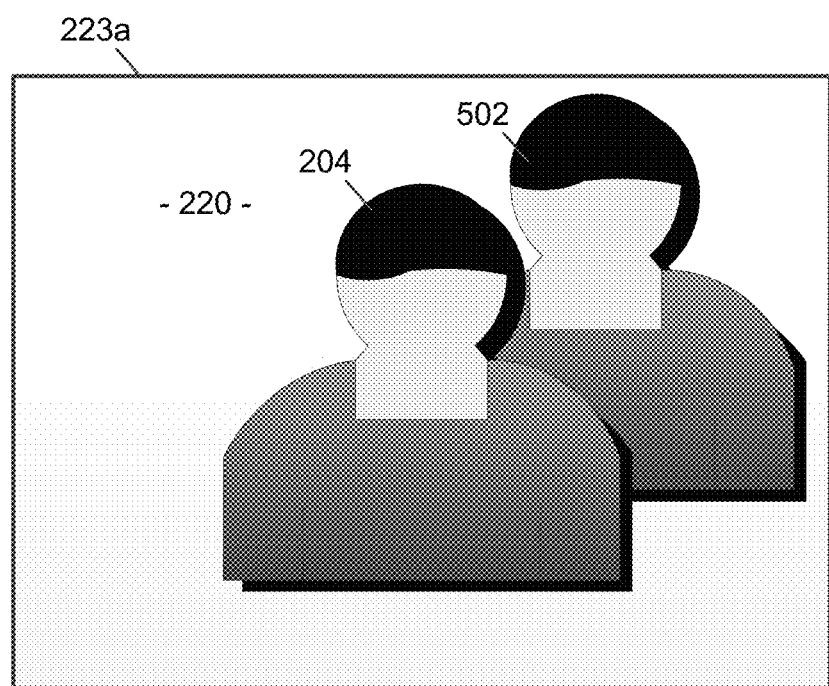
FIG. 5A is a schematic view of a digital image captured during the method set forth in FIG. 1.

With reference to FIGS. 2, 5 and 5A, system 200 may be used to implement method 400, as well as other method described herein. In particular, system 400 provides for the storage of at least one feature or attribute of at least one authorized user is stored in memory 212, 214, and/or 216. The processor of work computing device 202 may execute computer executable instructions to capture the at least one digital image 223a using camera 222, wherein digital image 223a includes a first user 502 in field of view 220. It should be understood that first user 502 may be the only person in field of view 220, or may be one of a plurality of users 204, 502 (e.g., second user) in field of view 220. Also, when referring to a user, this could include just the face of a user, the whole body of a user, or any portion thereof. Regardless of the number of user's in field of view 220, method 400 may be performed on each user individually or in a collective manner if such processing can be accommodated by the processor. After the digital image is captured, the digital image is stored in one or more of memory 212, 214, and/or 216. The capture of the digital image may take place at a pre-determined time interval or random time intervals. Computer executable instructions are further configured to identify or detect at least one feature or attribute of first user 502 captured in the captured digital image, and then compare the at least one feature or attribute of first user 502 with the at least one feature or attribute of the unauthorized user(s).

When the feature or attribute of first user 502 does not match the feature or attribute of the authorized user, the processor in the work computing device 202 is configured for executing computer executable code that operates to send a notification to the administrative computing device 208 over network 210, wherein the notification may include digital image 223a captured by the camera. The digital image included in the notification may include or be provided with a time stamp or other unique searchable identifier so that the digital image can be searched and retrieved from the memory for later viewing on administrative computing device 208. The processor in the work computing device 202 may also, or alternatively, execute computer executable code that is configured to prevent at least a portion of display 218 from being viewed from field of view 220 to prevent first user 502 from viewing or reading information being displayed on display 218 in the manner described above with respect to method 400. The processor in work computing device 202 may also, or alternatively, execute computer executable code that is configured to capture and/or store representative data that identifies the software applications and/or other functions that are running on the work computing device 202 when at least one unauthorized individual is detected and identified as an unauthorized individual. This representative date can take the form of, for example, a screen shot of a task manager window that is automatically opened on work computing device 202 when an unauthorized user is detected, which shows all of the software applications and/or other functions running on work computing device 202 at the time the unauthorized individual is detected.

With reference to the discussion provided above, both method 100 and 400 include the step of capturing at least one digital image using the camera on the work computing device. When the at least one digital image is captured in the home work environment, the field of view of the camera presumably is directed to the employee working on the work computing device as an area of interest. Since the employee is working from home, the field of view will also include a background that will include a view the employee's home and personal effects disposed therein that can be seen in the field of view behind the area of interest. For example, the background could include personal family photos and items. An employee has a certain expectation of privacy in the home including the background that may be provided in the field of view. In order to provide the employee with a certain level of privacy, methods 100, 400 may further include the step of masking the background in the at least one digital image that is captured by the camera using a background subtraction method. The masking may include, but is not limited to, blacking out, blurring, or digitally changing the background on the captured at least one digital image so that only the employee is seen in the captured at least one digital image, excluding any unauthorized object or individual that is present in the field of view.

In certain work-from-home or office situations, an employee could have access to computer applications that are necessary to service a client, and in the process would have access to sensitive information related to the customer-personal identifiable information (PII), credit score, bank information and other confidential information. However, not all sensitive information is needed by the employee in order to perform the tasks delegated to them. In order to address this security issue with respect to sensitive information, another aspect of the present invention provides a computer-implemented data masking method 600 including executable instructions 205 (FIG. 2) programmed for execution in a computing environment for controlling the display of sensitive information in a remote/home work environment. Sensitive information can include, but is not limited to, personal identifiable information and/or confidential information. Personal identifiable information may include, but is not limited to, a name, social security number, mailing address, email address, or phone number. Confidential information may include, but is not limited to, credit card numbers, bank account numbers, and other payment information.

Figure 6:
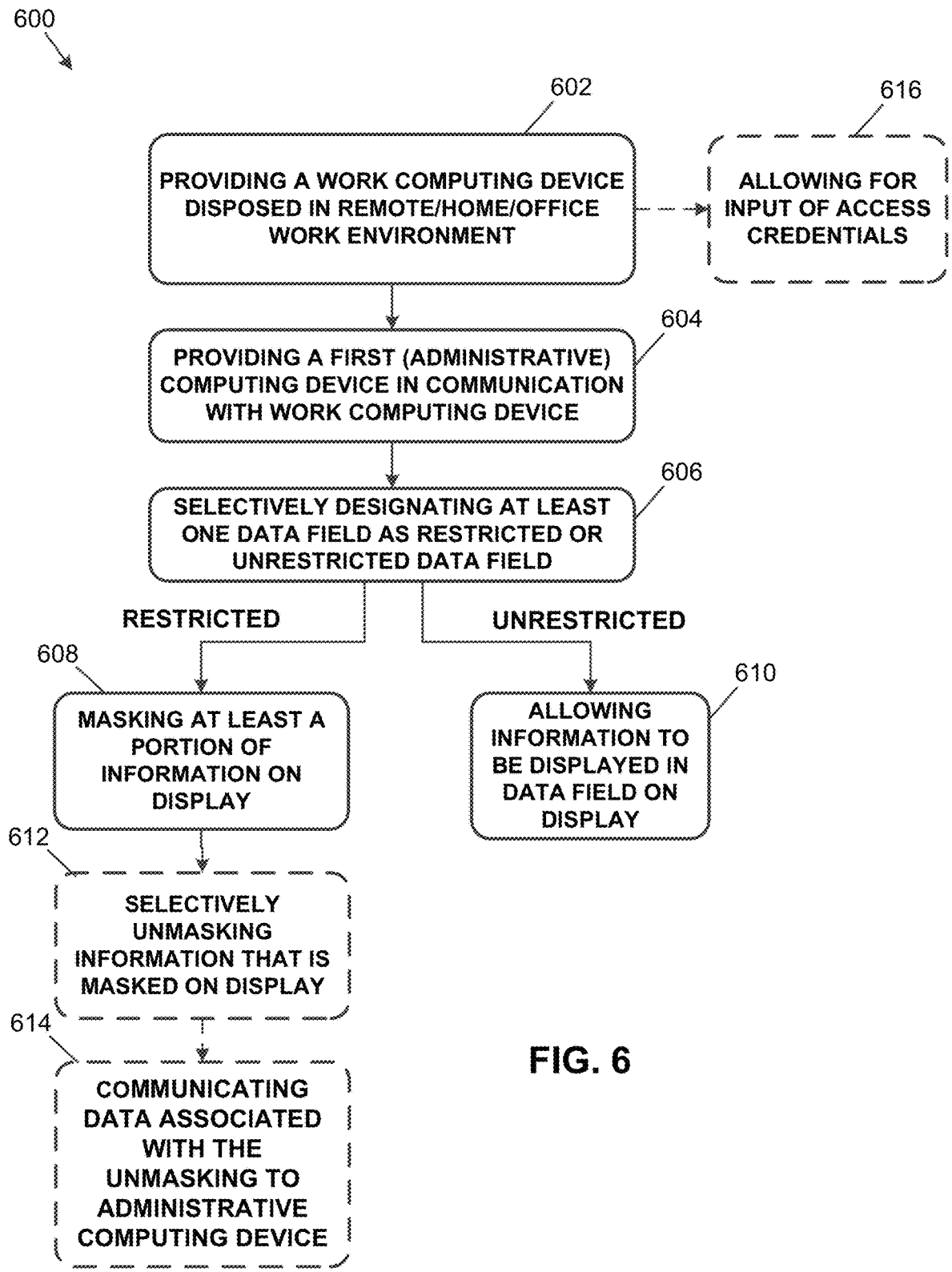
FIG. 6 is a flow chart illustrating yet another exemplary method for implementing one or more aspects of the present invention.

With reference to FIG. 6, method 600 includes the step of providing a work computing device disposed in the remote/home or office work environment at step 602. The work computing device may include a first memory, a first display, and a first processor for executing a web-based computer application accessible over a network. The web-based computer application may be a stand-alone computer application, or a software module that works in association with another software platform (e.g., client-based software platform), which is stored in, or be hosted by, a remote server or computing device over the network and configured to operate in association with a window that displays information contained in at least one data field on the display of the work computing device. At step 604, method 600 further includes providing a first computing device in communication with the work computing device, wherein the first computing device includes a second memory for storing computer executable instructions that implements the present method. For example, the first computing device may be an administrative computing device, and for purposes of the following discussion, the first computing device will be hereinafter referred to as the administrative computing device. A second processor is further provided in the administrative computing device to execute the computer executable instructions to selectively designate at least one of the data fields as either a restricted data field or an unrestricted data field in step 606. It should be understood that the above-referenced selective designation can comprise the selection of certain data fields as restricted, whereby the unselected data fields are automatically designated as unrestricted. Likewise, the selective designation can also comprise the selection of certain data fields as unrestricted, whereby the unselected data fields are automatically designated as restricted. Both of these alternatives are embodied within step 604.

Figures 7, 8:
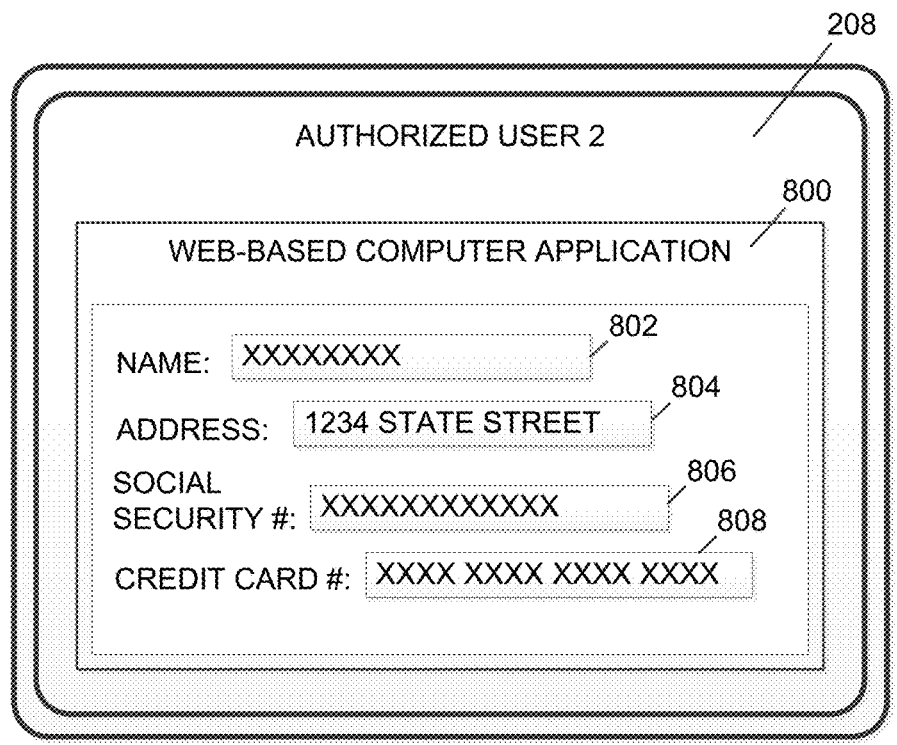
FIG. 7 is an exemplary user authorization chart showing certain restricted/unrestricted designations for a plurality of data fields for associated authorized users.
FIG. 8 is a schematic drawings showing an exemplary display of a work computing device with certain data fields redacted.

In accordance with this aspect of the invention, when at least one field is designated as a restricted field, and the web-based computer application or software platform is calling for the display of the sensitive information, method 600 moves to step 608 which includes masking all or a portion of (e.g., only show last four digits of credit card number) the information contained in the at least one data field so that the information is not viewable on the first display. It should be understood that masking includes but is not limited to redacting information for legal, security, or other purposes. For example, the masking function may take any desired form or function, such as, but not limited to, overlaying an opaque box (e.g., black box) on top of the information in the respective field, or it could be an operation where the information contained in the restricted field is replaced with a generic alpha/numeric character (e.g., X or *) as shown in FIG. 8. This functionality will help prevent an employee from being able to view sensitive information when working from a home/remote or office work environment, particularly when the employee has no reason to view such information to perform his or her duties. Further, when the at least one field is designated as an unrestricted field in step 606, method 600 further includes the step 610 of allowing the information contained in the at least one data field to be viewed on the first display of the work computing device. It should be noted that no alterations are required to the software platform or infrastructure within working computing device in order to implement the method of masking as described above.

Method 600 may further include optional step 612 which allows the work computing device to be used to selectively unmask one or more of the masked data fields so that the information contained in the data field to be displayed on the display of the work computing device. The selective unmasking can be achieved, for example, by using a user selection device (e.g., computer mouse) associated with the work computing device. When the work computing device is used to unmask one or more of the masked data fields, method 600 further includes communicating data to administrative computing device over the network associated with the unmasking, including, but not limited to, identifying the data field(s) that were selectively unmasked, the work computing device that was used to unmask the data field(s), and a time stamp associated with the selective unmasking at step 614. This data communicated to administrative computing device may then be stored in memory 214 or remote server 216 so that the unmasking can be tracked and analyzed.

Method 600 may also optionally include the step 616 of allowing an authorized user with access to the work computing device upon input of approved access credentials by the authorized user, such as, but not limited to, a user name and password, biometrics, alpha-numerical code, etc. In other words, the work computing device is only permitted to be accessed if properly authorized credentials are authenticated by a corresponding authentication database that may be associated with the administrative computing device. In the case where credentials are used to provide access to the work computing device, the selective designation of the at least one data field as either the restricted data field or the unrestricted data field may be performed and associated with respect to the authorized user.

It is also contemplated that separate authentication credentials be provided for a plurality of authorized users in the authentication database where the selective designation of the at least one data field as either the restricted data field or the unrestricted data field is separately performed and associated with respect to each of the plurality of authorized users, as seen in FIG. 7, for example. With reference to FIGS. 7 and 8, for instance, authorized user 2 has certain permissions set, wherein Fields 1, 3 and 4 have been designated as unrestricted, and Field 2 as restricted so these fields are redacted or masked so that the user of the work computing device cannot see the information contained in these fields. As seen in FIG. 7, authorized users 1 and 3 have different permissions set by administrative computing device so the work computing device is permitted to display different information compared to authorized user 2.

Now referring back to FIG. 2, exemplary system 200 in whole or in part may be used to implement method 600 and other methods and aspects described herein. In particular, and as described above, system 200 is configured for controlling the display of sensitive information in home work environment 206. For purposes of implementing method 600, system 200 comprises work computing device 202, which includes memory 212, display 218, and a processor for executing web-based computer application that is stored in memory 214 or remote server 216 and accessible over network 210. As seen in FIG. 8, a window 800 provided by a web-based computer application is configured to display information contained in at least one data field 802, 804, 806, 808 on display 218. It is also within the scope of the present invention to implement method 600 in regard to information that is displayed by a computer application that is stored and processed locally by work computing device 202. The information displayed in web-based computer application 800 may include sensitive and non-sensitive information.

In implementing method 600, system 200 may further include administrative computing device 208 that is in communication with work computing device 202 over network 210. Administrative computing device 208 includes memory 214 for storing computer executable instructions for implementing method 600, and a processor for performing the step 606 of selectively designating at least one of the data fields 802, 804, 806, 808 as either a restricted data field or an unrestricted data field. It should be understood that the computer executable instructions for implementing method 600 could also be stored in server 216. As indicated above, and with reference to FIGS. 7 and 8, when at least one field 802, 806, 808 is designated as the restricted field, then the computer executable instructions operate to mask/redact at least a portion of the information contained in the at least one data field 802, 806, 808 so that the information is not viewable on display 218. Alternatively, when a field 804 is designated as an unrestricted field, then the computer executable instructions operate to allow the information contained in the at least one data field to be viewed on display 218.

System 200 may further include an authentication module 226 for providing one or more authorized users with access to work computing device 202 upon input of approved access credentials by the respective authorized user. Authentication module may be stored in memory 212 of work computing device 202, memory 214 included in administrative computing device 208, or server 216. As referred to above with respect to method 600, the computer executable instructions allow for the selective designation of at least one data field 802, 804, 806, 808 being displayed by the web-based computer application as either the restricted data field or the unrestricted data field is performed and associated with respect to the authorized user. As such, the permissions provided with respect to each authorized user may be customized depending on the duties and tasks that the authorized user (e.g., employee) is responsible for and the corresponding information that is needed to perform those tasks. In other words, if a particular authorized user needs to know the name of the individual in order to provide a service that is requested, then the data field associated with the individual's name would be identified as, or left as, unrestricted, while the other data fields associated with other sensitive information would be designated as restricted so that the corresponding information is masked/redacted.

In certain situations, an employee working from home or the office could be using an employer-provided computing device or a personal computing device to access computer applications required to perform job duties. In either case, there is a possibility that the employee could be using a computer application that has not been authorized by the employer, perhaps using such an unauthorized computer application for an improper purpose. For example, an employee could be using a key logger or screen capture software application that records or captures every key stroke that the employee takes so that the information can later be used for an improper purpose. There is a need to monitor and ensure that only authorized computer applications are being used by the employee.

Figure 9:
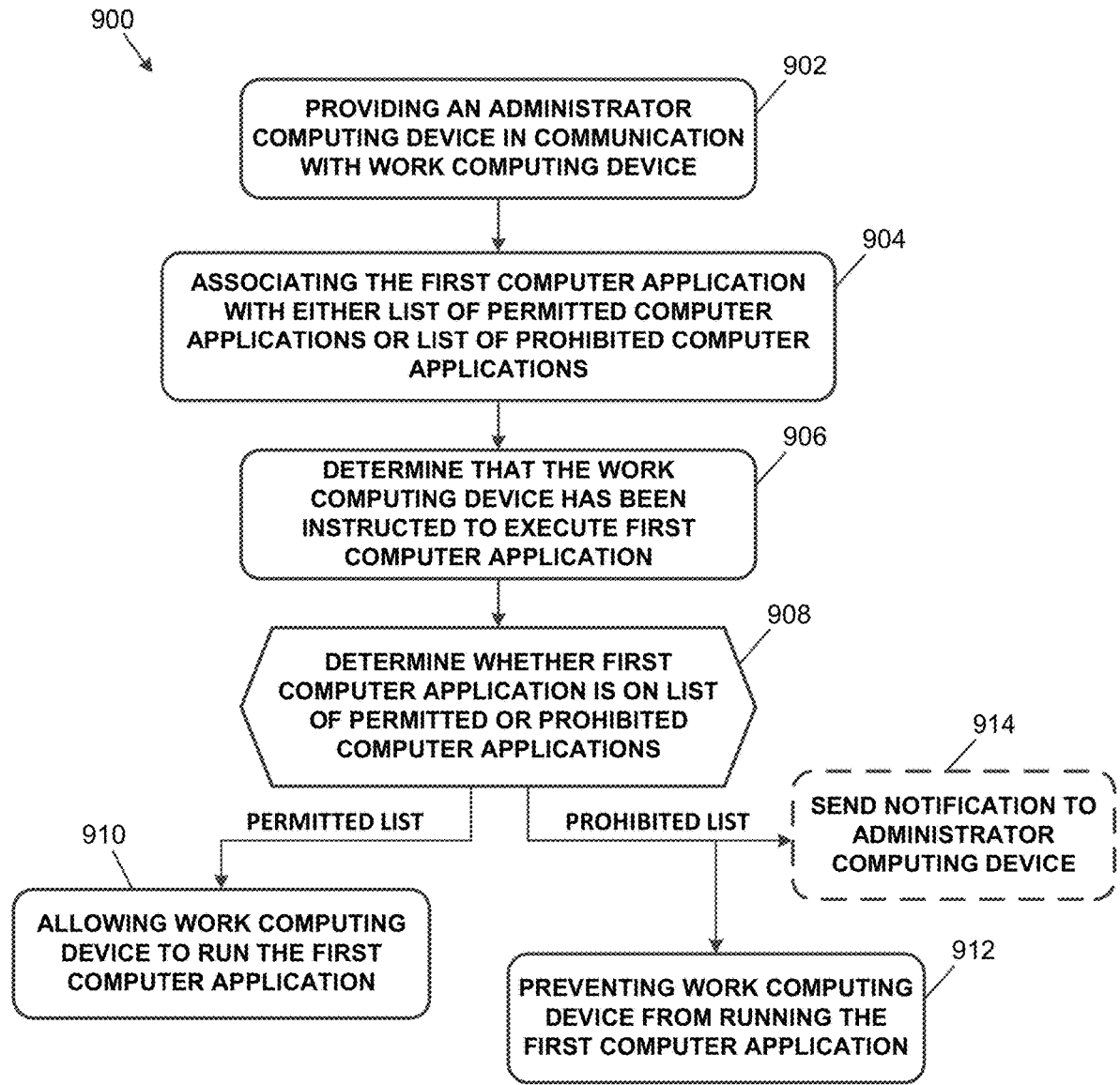
FIG. 9 is a flow chart illustrating still another exemplary method for implementing one or more aspects of the present invention.

To that end, with reference to FIG. 9, yet another aspect of the present invention provides a computer-implemented application monitoring method 900 including executable instructions 207 (FIG. 2) programmed for execution in a computing environment for controlling the usage of one or more computer applications or websites (referred to below as, "computer applications") on a work computing device located in a home or office work environment. When a user is using a computer in a location that is remote from a place of employment, it is difficult for the employer to monitor and control the computer applications that are used by the user, particularly when the user is using a personal computer to access the employer's computer systems through a network. Method 900 addresses this issue by identifying and/or tagging certain computer applications as being approved and/or prohibited, by the employer, identifying when a computer application is being opened by the user, and either allowing or prohibiting the use of such computer application depending on the approved/prohibited designation. An exemplary process of accomplishing this objective is set forth below.

As mentioned previously, the work computing device includes a memory, display, and processor for executing a first computer application including a first set of computer executable instructions. The method comprises providing an administrative computing device in communication with the work computing device over the network at step 902. Further, the administrative computing device includes a memory having a database or other data structure stored therein that includes a list or other identification of one or more permitted computer applications and/or a list or other identification of one or more prohibited computer applications. The memory of the administrative computing device also includes a second computer application including a second set of computer executable instructions stored therein. Utilizing the second set of computer executable instructions, method 900 is configured for selectively associating the first computer application with either the list of permitted computer applications or the list of prohibited computer applications at step 904. Further, the lists of permitted and/or prohibited computer applications may be synced to the work computing device and locally stored in the memory of the working computing device. At step 906, the second set of computer executable instructions is configured to determine that the first processor of the work computing device has been instructed to execute the first computer application. For example, the second set of computer executable instructions can operate to continuously or intermittently scan all of the running applications on the random access memory (RAM), and the websites that are being launched, on the work computing device at a predetermined time interval to determine if the processor of the work computing device has been instructed to execute the first computer application. Once it is determined that the work computing device the first computer application has been launched or is running, then the second set of computer executable instructions is configured to determine whether the first application is associated with either the list of permitted computer applications or the list of prohibited computer applications by comparing the launched or running application with at least one of the aforementioned permitted or prohibited lists at step 908. Upon determining that the first computer application is associated with the list of permitted computer applications, the second computer executable instructions are configured to allow the processor of the work computing device to execute the first set of executable instructions at step 910. Further, upon determining that the first computer application is associated with the list of prohibited computer applications, the second computer executable instructions are configured to prevent the processor of the remote computing service from executing the first set of executable instructions at step 912. In addition, a notification may be communicated to administrative computing device over the network at step 914 if it is determined that the first computer application is associated with the list of prohibited computer applications. The notification can include any type of text-based message, graphical message, sound or visual (e.g., light) alert indicating that an attempt is being made to run a prohibited computer application on the work computing device.

Referring to FIG. 2, exemplary system 200 in whole or in part in may be used to implement method 900, and other methods described herein, to control the usage of one or more computer applications in a remote/home or office work environment. For the purpose of implementing method 900, system 200 comprise administrative computing device 208, which includes a processor and memory 214 having a database or other data structure stored therein that includes the list or other identification of one or more permitted computer applications and/or the list or other identification of one or more prohibited computer applications as previously described. Memory 214 also includes a monitoring computer application including a set of computer executable instructions which will be described in more detail below. It should be understood that the above-referenced items, including the database and/or monitoring computer application, may be alternatively or additionally stored in server 216 and/or locally in work computing device 202. System 200 further comprises work computing device 202 having memory 212, display 218, and a processor for executing a target computer application including a set of computer executable instructions. The monitoring computer application is configured to allow for the selective association of the computer application stored in memory 212 with either the list of permitted computer applications or the list of prohibited computer applications. If the monitoring computer application detects, identifies, or receives a notification or communication that the processor of work computing device 202 is going to run (or has started running) the target computer application, then a determination is made by the monitoring computer application whether the target application is associated with the list of permitted or prohibited computer applications. If the target computer application is associated with the list of permitted computer applications, then the monitoring computer application allows the processor of work computing device 202 to run the target computer application in the manner described above with respect to method 900. Alternatively, if the target computer application is associated with the list of prohibited computer applications, then the monitoring computer application prevents the processor of work computing device 202 from running the target computer application in the manner described above with respect to method 900.

In another aspect, it should be understood that the methods set forth above may be embodied in computer readable instructions stored on a non-transitory computer readable medium.

Having described the system and method of the present invention and an embodiment thereof, an exemplary computer environment for implementing the described design and execution is presented next.

Figure 10:
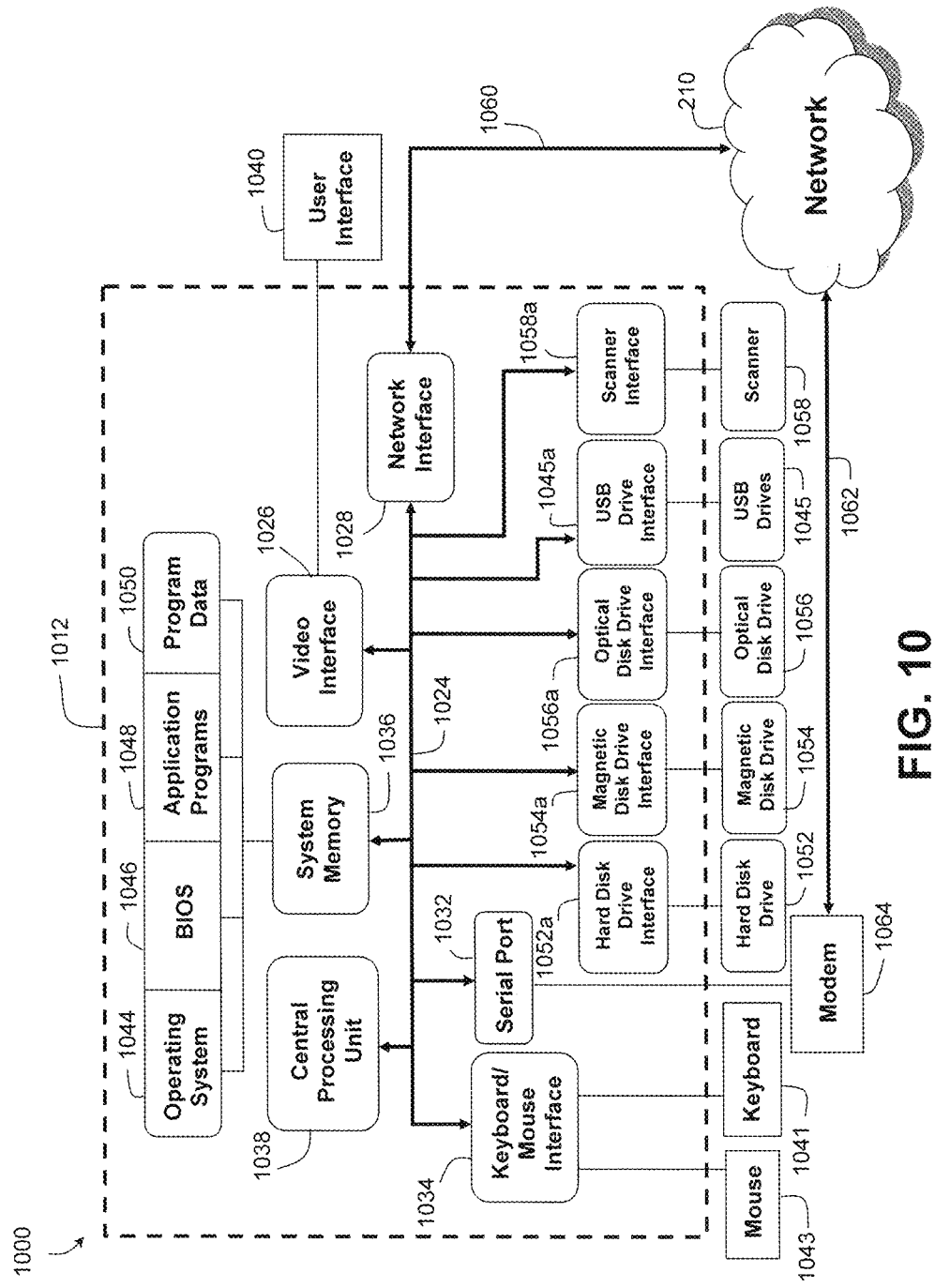
FIG. 10 is a block diagram generally illustrating a computing environment in which the invention may be implemented.

FIG. 10 shows an exemplary computing environment 1000 that can be used to implement any of the processing thus far described. Computing environment 1000 may include one or more computers 1012 (such as work computing device 202, 202a, 202b, administrative computing device 208, server 216) comprising a system bus 1024 that couples a video interface 1026, network interface 1028, a keyboard/mouse interface 1034, and a system memory 1036 (e.g., memory 212, 214, 216) to a Central Processing Unit (CPU) 1038. A display 1040 (e.g., display 218) is connected to bus 1024 by video interface 1026 and provides the user with a graphical user interface to view digital images/videos 223, 223a, window 800, data fields 802, 804, 806, 808, notifications, alerts, and lists of permitted/prohibited applications. The graphical user interface allows the user to enter commands and information into computer 1012 using a keyboard 1041 and a user interface selection device 1043, such as a mouse, touch screen, or other pointing device. Keyboard 1041 and user interface selection device 1043 may be connected to bus 1024 through keyboard/mouse interface 1034. The display 1040 and user interface selection device 1043 are used in combination to form the graphical user interface which allows the user to implement at least a portion of the present invention. Other peripheral devices may be connected to the remote computer through universal serial bus (USB) drives 1045 to transfer information to and from computer 1012. For example, cameras and camcorders may be connected to computer 1012 through serial port 1032 or USB drives 1045 so that digital images/videos 223, 223a may be captured and displayed on display 1040, downloaded to system memory 214, 216 or another memory storage device associated with computer 1012.

The system memory 1036 (e.g., memory 212, 214, 216) is also connected to bus 1024 and may include read only memory (ROM), random access memory (RAM), an operating system 1044, a basic input/output system (BIOS) 1046, application programs 1048 and program data 1050. The computer 1012 may further include a hard disk drive 1052 for reading from and writing to a hard disk, a magnetic disk drive 1054 for reading from and writing to a removable magnetic disk (e.g., floppy disk), and an optical disk drive 1056 for reading from and writing to a removable optical disk (e.g., CD ROM or other optical media). The computer 1012 may also include USB drives 1045 and other types of drives for reading from and writing to flash memory devices (e.g., compact flash, memory stick/PRO and DUO, SD card, multimedia card, smart media xD card), and a scanner 1058 for scanning items to computer 1012. A hard disk drive interface 1052a, magnetic disk drive interface 1054a, an optical drive interface 1056a, a USB drive interface 1045a, and a scanner interface 1058a operate to connect bus 1024 to hard disk drive 1052, magnetic disk drive 1054, optical disk drive 1056, USB drive 1045 and scanner 1058, respectively. Each of these drive components and their associated computer-readable media may provide computer 1012 with non-volatile storage of computer-readable instruction, program modules, data structures, application programs, an operating system, and other data for computer 1012. In addition, it will be understood that computer 1012 may also utilize other types of computer-readable media in addition to those types set forth herein, such as digital video disks, random access memory, read only memory, other types of flash memory cards, magnetic cassettes, and the like.

Computer 1012 may operate in a networked environment using logical connections with each of the system components described above. Network interface 1028 provides a communication path 1060 between bus 1024 and network 210, which allows, for example, digital images/video 223, 223a, notifications, alerts, data masking instructions, and other information to be communicated through network 210 between the respective components of system 200. This type of logical network connection is commonly used in conjunction with a local area network (LAN). These items may also be communicated from bus 1024 through a communication path 1062 to network 210 using serial port 1032 and a modem 1064. Using a modem connection between the computer 1012 and the other components of system 200 is commonly used in conjunction with a wide area network (WAN). It will be appreciated that the network connections shown herein are merely exemplary, and it is within the scope of the present invention to use other types of network connections between computer 1012 and the other components of system 200 including both wired and wireless connections.

In utilizing the system and method in accordance with the present invention, numerous advantages are realized. For example, in order to control the unauthorized disclosure of information displayed by the work computing device in a remote/home or office work environment, the present system and method provides for real-time monitoring using computer vision to ensure that the administrative computing device is notified if an unauthorized object or user is detected or identified in the field of view of the display of the work computing device, and optionally preventing the work computing device from being used. Further control of the disclosure of information displayed on the work computing device is accomplished by selectively masking sensitive information disposed in one or more data fields on the display of the work computing device, wherein the selection of the one or more data fields to be masked can be provided by the administrative computing device. In order to further control the use of the work computing device in the remote/home or office work environment, the system and method may further provide the ability to only allow computer applications to be used on the work computing device that is provided on an authorized list of computer applications, and/or prevent those computer applications that are provided on the list of prohibited computer applications.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A system for monitoring and controlling usage of a work computing device located in a home or office work environment, wherein the work computing device is in communication with a first computing device over a network, the system comprising:
   a first memory for storing computer-executable instructions, wherein at least one feature or attribute for each of a plurality of unauthorized objects is stored in the first memory, the plurality of unauthorized objects including unauthorized recording devices and users not identified as authorized users;
   a display viewable from within a field of view;
   a camera directed at the field of view of the display, wherein the camera is configured for capturing at least one digital image;
   a processor configured for executing the computer-executable instructions to perform the following steps:
      (a) capturing the at least one digital image using the camera, wherein the at least one digital image includes a first object in the field of view of the display;
      (b) storing the at least one digital image that was captured in the first memory;
      (c) identifying at least one feature or attribute of the first object captured in the at least one digital image;
      (d) comparing the at least one feature or attribute of the first object in the field of view of the display with the at least one feature or attribute of at least one unauthorized object of the plurality of unauthorized objects; and
      (e) when the at least one feature or attribute of the first object in the field of view of the display matches the at least one feature or attribute of at least one unauthorized object of the plurality of unauthorized objects:
         (i) sending a notification to the first computing device over the network, wherein the notification includes the at least one digital image captured by the camera of the first object within the field of view of the display; and
         (ii) preventing at least a portion of the display from being viewed from the field of view of the display.

2. The system in accordance with claim 1, wherein the at least one digital image is stored in a second memory that is accessible by the first computing device, and wherein the at least one digital image includes a time stamp.

3. The system in accordance with claim 1, wherein preventing at least a portion of the display from being viewed includes shutting down the work computing device.

4. The system in accordance with claim 1, wherein the first memory is included in the work computing device.

5. The system in accordance with claim 1, wherein the first memory is a server, wherein the server is in communication with the work computing device over the network.

6. The system in accordance with claim 1, wherein the camera is a webcam.

7. The system in accordance with claim 1, wherein the at least one digital image is a video.

8. The system in accordance with claim 7, wherein the video is a real-time video.

9. The system in accordance with claim 1, wherein the camera captures a plurality of digital images, and wherein each of the plurality of digital images are captured at a predetermined time interval.

10. The system in accordance with claim 1, wherein the camera captures a plurality of digital images, and wherein each of the plurality of digital images are captured at random time intervals.

11. The system in accordance with claim 1, wherein the first object is at least one of a mobile phone, digital tablet, laptop, notepad, or writing utensil.

12. The system in accordance with claim 1, wherein the at least one feature or attribute of the at least one unauthorized object is at least one dimension or shape of the at least one unauthorized object stored in the first memory, and wherein the at least one feature or attribute of the first object is at least one dimension or shape of the first object.

13. The system in accordance with claim 1, wherein the at least one feature or attribute of the at least one unauthorized object is a digital image of the at least one unauthorized object stored in the first memory, and wherein the at least one feature or attribute of the first object is a digital image of the first object.

14. The system in accordance with claim 1, wherein when the at least one feature or attribute of the first object matches the at least one feature or attribute of at least one unauthorized object, the processor is configured for performing at least one of step (e)(i) or step (e)(ii), or:
   (e)(iii) capturing data identifying one or more software applications that are running on the work computing device, and sending the captured data to the first computing device over the network.

15. The system in accordance with claim 14, wherein the step of capturing data identifying the one or more software applications that are running on the work computing device includes opening a task manger window on the work computing device and taking a screen shot of the task manger window, wherein the task manger window includes a list of software applications running on the work computing device.

16. The system in accordance with claim 1, wherein the at least one digital image includes a background, wherein the processor is configured for performing an additional step of masking the background prior to step (b).

17. A computer-implemented method programmed for execution in a computing environment for monitoring and controlling usage of a work computing device located in a home or office work environment, wherein the work computing device is in communication with a first computing device over a network, wherein the work computing device comprises a display viewable from within a field of view, a camera directed at the field of view of the display and configured for capturing at least one digital image, and a processor configured for executing computer-executable instructions, utilizing the processor the method comprising:
   (a) providing a first memory for storing the computer-executable instructions, wherein at least one feature or attribute for each of a plurality of unauthorized objects is stored in the first memory, the plurality of unauthorized objects including unauthorized recording devices and users not identified as authorized users;
   (b) capturing the at least one digital image using the camera, wherein the at least one digital image includes a first object in the field of view of the display;
   (c) storing the at least one digital image that was captured in the first memory;
   (d) identifying at least one feature or attribute of the first object captured in the at least one digital image;
   (e) comparing the at least one feature or attribute of the first object in the field of view of the display with the at least one feature or attribute of at least one unauthorized object of the plurality of unauthorized objects; and
   (f) when the at least one feature or attribute of the first object in the field of view of the display matches the at least one feature or attribute of at least one unauthorized object of the plurality of unauthorized objects:
      (i) sending a notification to the first computing device over the network, wherein the notification includes the at least one digital image captured by the camera; and
      (ii) preventing at least a portion of the display from being viewed from the field of view.

18. The method in accordance with claim 17, wherein the at least one digital image is stored in a second memory that is accessible by the first computing device, and wherein the at least one digital image includes a time stamp.

19. The method in accordance with claim 17, wherein preventing at least a portion of the display from being viewed includes shutting down the work computing device.

20. The method in accordance with claim 17, wherein the first memory is included in the work computing device.

21. The method in accordance with claim 17, wherein the first memory is a server, wherein the server is in communication with the work computing device over the network.

22. The method in accordance with claim 17, wherein the camera captures a plurality of digital images, and wherein each of the plurality of digital images are captured at a predetermined time interval.

23. The method in accordance with claim 17, wherein the camera captures a plurality of digital images, and wherein each of the plurality of digital images are captured at random time intervals.

24. The method in accordance with claim 17, wherein the first object is at least one of a mobile phone, digital tablet, laptop, notepad, or writing utensil.

25. The method in accordance with claim 17, wherein when the at least one feature or attribute of the first object matches the at least one feature or attribute of at least one unauthorized object, the processor is configured for performing at least one of step (f)(i), step (f)(ii), or:
   (f)(iii) capturing data identifying one or more software applications that are running on the work computing device, and sending the captured data to the first computing device over the network.

26. The method in accordance with claim 25, wherein the step of capturing data identifying the one or more software applications that are running on the work computing device includes opening a task manger window on the work computing device and taking a screen shot of the task manger window, wherein the task manger window includes a list of software applications running on the work computing device.

27. The method in accordance with claim 17, wherein the at least one digital image includes a background, wherein the processor is configured for performing an additional step of masking the background prior to step (c).

28. A system for monitoring and controlling usage of a work computing device located in a home or office work environment, wherein the work computing device is in communication with a first computing device over a network, the system comprising:
   a first memory for storing computer-executable instructions, wherein at least one feature or attribute of at least one authorized user and at least one feature or attribute for each of a plurality of unauthorized objects is stored in the first memory;
   a display viewable form within a field of view;
   a camera directed at the field of view of the display, wherein the camera is configured for capturing at least one digital image;
   a processor configured for executing the computer-executable instructions to perform the following steps:
      (a) capturing the at least one digital image using the camera, wherein the at least one digital image includes a first user or a first object in the field of view of the display;
      (b) storing the at least one digital image that was captured in the first memory;

(c) identifying at least one feature or attribute of the first user or the first object captured in the at least one digital image;

(d) comparing the at least one feature or attribute of the first user or the first object in the field of view of the display with the at least one feature or attribute of the at least one authorized user and the at least one feature or attribute for each of the plurality of unauthorized objects; and (e) when the at least one feature or attribute of the first user in the field of view of the display does not match the at least one feature or attribute of at least one authorized user or when the at least one feature or attribute of the first object matches at least one feature or attribute of one of the plurality of unauthorized objects:

(i) sending a notification to the first computing device over the network, wherein the notification includes the at least one digital image captured by the camera of the at least one feature or attribute of the first user or the first object within the field of view of the display; and (ii) preventing at least a portion of the display from being viewed from the field of view of the display.

29. The system in accordance with claim 28, wherein the at least one captured digital image includes a second user in the field of view, and wherein when the second user is captured in the field of view, the processor is configured for performing at least one of the following additional steps:

(f)(i) sending a notification to the first computing device over the network, wherein the notification includes the at least one digital image including the second user captured by the camera; or (f)(ii) preventing at least a portion of the display from being viewed from the field of view.

30. The system in accordance with claim 29, wherein the second user is a face of the second user.

31. The system in accordance with claim 29, wherein when the second user is captured in the field of view, the processor is configured for performing the step of:

comparing the at least one feature or attribute of the second user with the at least one feature or attribute of the at least one authorized user, and wherein when the at least one feature or attribute of the second user does not match the at least one feature or attribute of the at least one authorized user, the steps proceed with at least one of step (f)(i) or step (f)(ii).

32. The system in accordance with claim 28, wherein the at least one digital image is stored in a second memory that is accessible by the first computing device, and wherein the at least one digital image includes a time stamp.

33. The system in accordance with claim 28, wherein preventing at least a portion of the display from being viewed includes shutting down the work computing device.

34. The system in accordance with claim 28, wherein the first memory is included in the work computing device.

35. The system in accordance with claim 28, wherein the first memory is a server, wherein the server is in communication with the work computing device over the network.

36. The system in accordance with claim 28, wherein the camera is a webcam.

37. The system in accordance with claim 28, wherein the at least one digital image is a video.

38. The system in accordance with claim 37, wherein the video is a real-time video.

39. The system in accordance with claim 28, wherein the camera captures a plurality of digital images, and wherein each of the plurality of digital images are captured at a predetermined time interval.

40. The system in accordance with claim 28, wherein the camera captures a plurality of digital images, and wherein each of the plurality of digital images are captured at random time intervals.

41. The system in accordance with claim 28, wherein the first user is a face of the first user.

42. The system in accordance with claim 28, wherein the at least one feature or attribute of the at least one authorized user is at least one of hair color, eye color, gender, or age of the at least one authorized user stored in the first memory, and wherein the at least one feature or attribute of the first user is at least one of hair color, eye color, gender, or age of the first user.

43. The system in accordance with claim 28, wherein the at least one feature of the at least one authorized user is at least one of face shape, nose shape, ear shape, cheek structure, chin shape, or existence of glasses on the at least one authorized user stored in the first memory, and wherein the at least one feature of the first user is at least one of face shape, nose shape, ear shape, cheek structure, chin shape, or existence of glasses on the first user.

44. The system in accordance with claim 28, wherein when the at least one feature or attribute of the first user does not match the at least one feature or attribute of at least one authorized user or when the at least one feature or attribute of the first object matches at least one feature or attribute of one of the plurality of unauthorized objects, the processor is configured for performing at least one of step (f)(i), step (f)(ii), or:

(f)(iii) capturing data identifying one or more software applications that are running on the work computing device, and sending the captured data to the first computing device over the network.

45. The system in accordance with claim 44, wherein the step of capturing data identifying the one or more software applications that are running on the work computing device includes opening a task manger window on the work computing device and taking a screen shot of the task manger window, wherein the task manger window includes a list of software applications running on the work computing device.

46. The system in accordance with claim 28, wherein the at least one digital image includes a background, wherein the processor is configured for performing an additional step of masking the background prior to step (b).

47. A computer-implemented method programmed for execution in a computing environment for monitoring and controlling usage of a work computing device located in a home or office work environment, wherein the work computing device is in communication with a first computing device over a network, wherein the work computing device comprises a display viewable from within a field of view, a camera directed at the field of view of the display and configured for capturing at least one digital image, and a processor configured for executing computer-executable instructions, utilizing the processor the method comprising:

(a) providing a first memory for storing the computer-executable instructions, wherein at least one feature or attribute of at least one authorized user and at least one feature or attribute for each of a plurality of unauthorized objects is stored in the first memory;

(b) capturing the at least one digital image using the camera, wherein the at least one digital image includes a first user or a first object in the field of view of the display;

(c) storing the at least one digital image that was captured in the first memory;

(d) identifying at least one feature or attribute of the first user or the first object captured in the at least one digital image;

(e) comparing the at least one feature or attribute of the first user or the first object in the field of view of the display with the at least one feature or attribute of the at least one authorized user and the at least one feature or attribute for each of the plurality of unauthorized objects; and (f) when the at least one feature or attribute of the first user in the field of view of the display does not match the at least one feature or attribute of at least one authorized user or when the at least one feature or attribute of the first object matches at least one feature or attribute of one of the plurality of unauthorized objects:

(i) sending a notification to the first computing device over the network, wherein the notification includes the at least one digital image captured by the camera of the at least one feature or attribute of the first user or the first object within the field of view of the display; or (ii) preventing at least a portion of the display from being viewed from the field of view of the display.

48. The method in accordance with claim 47, wherein the at least one captured digital image includes a second user in the field of view, and wherein when the second user is captured in the field of view, the processor is configured for performing at least one of step (f)(i) or step (f)(ii).

49. The method in accordance with claim 48, wherein the second user is a face of the second user.

50. The method in accordance with claim 48, wherein when the second user is captured in the field of view, the processor is configured for performing the step of:

comparing the at least one feature or attribute of the second user with the at least one feature or attribute of the at least one authorized user, and wherein when the at least one feature or attribute of the second user does not match the at least one feature or attribute of the at least one authorized user, the method proceeds with at least one of step (f)(i) or step (f)(ii).

51. The method in accordance with claim 47, wherein the at least one digital image is stored in a second memory that is accessible by the first computing device, and wherein the at least one digital image includes a time stamp.

52. The method in accordance with claim 47, wherein preventing at least a portion of the display from being viewed includes shutting down the work computing device.

53. The method in accordance with claim 47, wherein the first memory is included in the work computing device.

54. The method in accordance with claim 47, wherein the first memory is a server, wherein the server is in communication with the work computing device over the network.

55. The method in accordance with claim 47, wherein the camera captures a plurality of digital images, and wherein each of the plurality of digital images are captured at a predetermined time interval.

56. The method in accordance with claim 47, wherein the camera captures a plurality of digital images, and wherein each of the plurality of digital images are captured at random time intervals.

57. The method in accordance with claim 47, wherein the first user is a face of the first user.

58. The method in accordance with claim 47, wherein prior to the capturing in step (b), the method includes the step of detecting the first user in the field of view.

59. The method in accordance with claim 47, wherein when the at least one feature or attribute of the first user does not match the at least one feature or attribute of at least one authorized user or when the at least one feature or attribute of the first object matches at least one feature or attribute of one of the plurality of unauthorized objects, the processor is configured for performing at least one of step (f)(i), step (f)(ii), or:

(f)(iii) capturing data identifying one or more software applications that are running on the work computing device, and sending the captured data to the first computing device over the network.

60. The method in accordance with claim 59, wherein the step of capturing data identifying the one or more software applications that are running on the work computing device includes opening a task manger window on the work computing device and taking a screen shot of the task manger window, wherein the task manger window includes a list of software applications running on the work computing device.

61. The method in accordance with claim 47, wherein the at least one digital image includes a background, wherein the processor is configured for performing an additional step of masking the background prior to step (c).

\* \* \* \* \*